Figure 1:
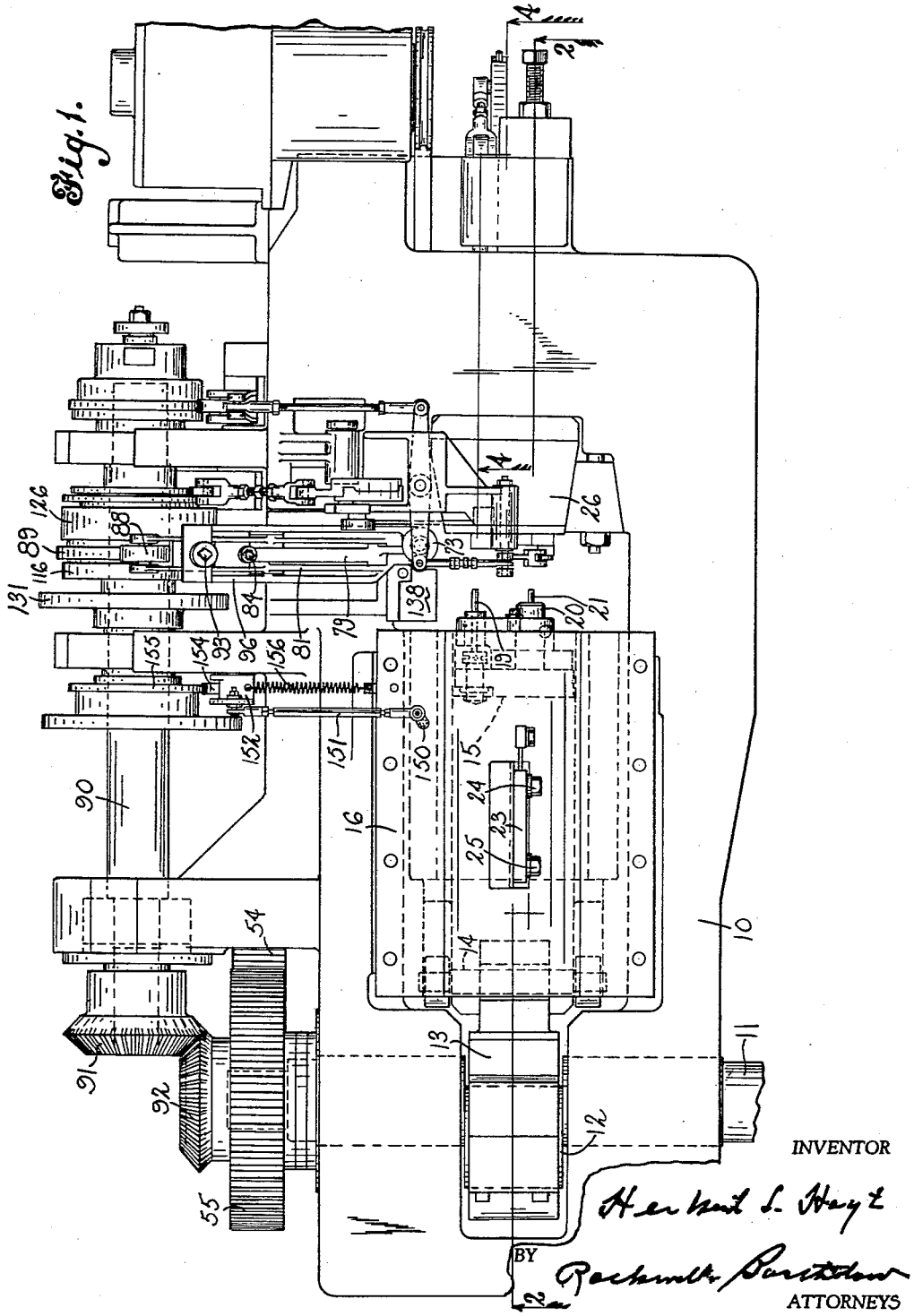

Dec. 3, 1963    H. L. HOYT    3,112,660
MACHINE FOR FORMING METAL ARTICLES
Filed Feb. 9, 1960    5 Sheets-Sheet 3

INVENTOR
Herbert L. Hoyt
BY
Rockwell & Bartholow
ATTORNEYS

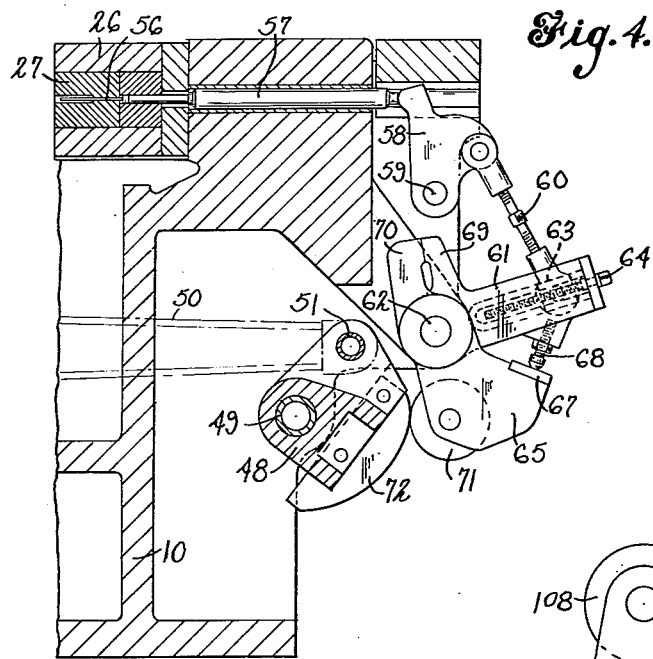
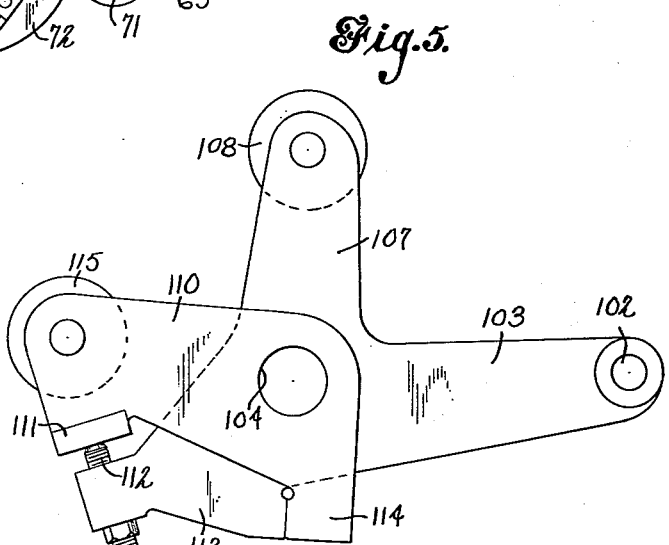
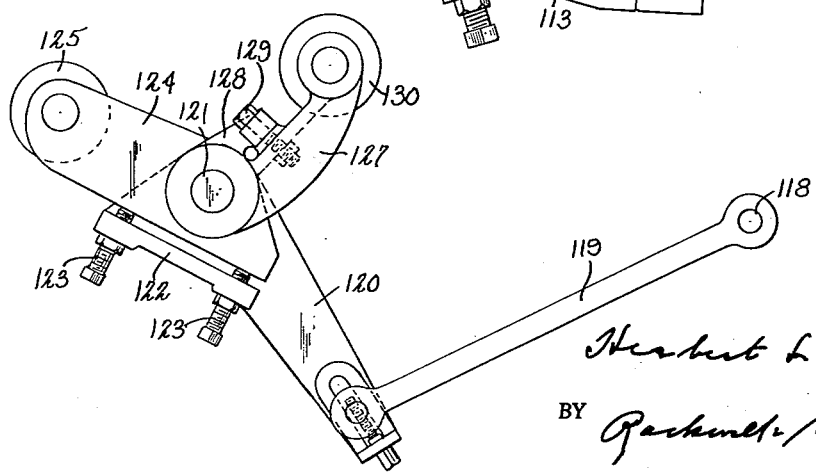

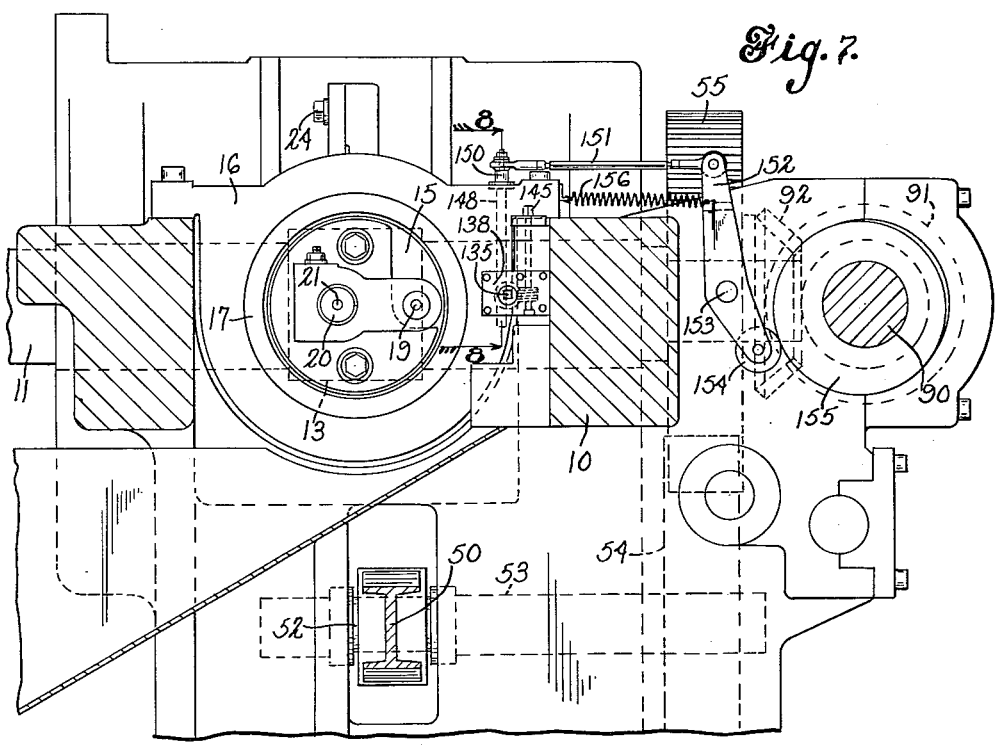
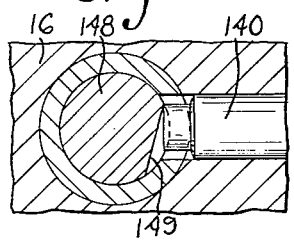
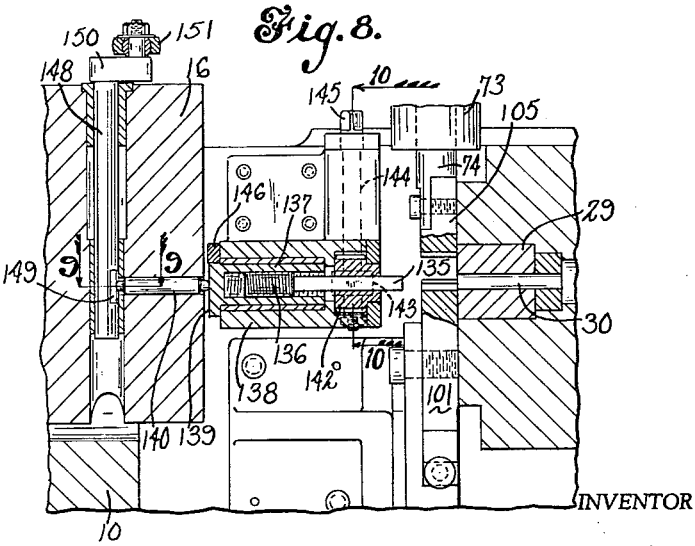
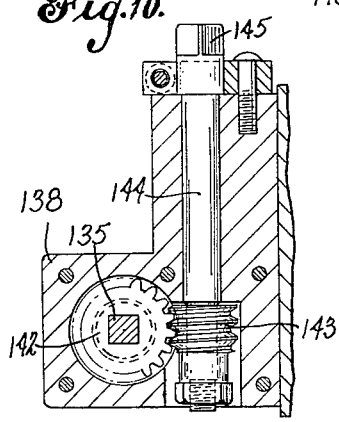

United States Patent Office 3,112,660
Patented Dec. 3, 1963

3,112,660
MACHINE FOR FORMING METAL ARTICLES
Herbert L. Hoyt, Waterbury, Conn., assignor, by mesne assignments, to Textron Industries, Inc., a corporation of Delaware
Filed Feb. 9, 1960, Ser. No. 7,703
3 Claims. (Cl. 78—17)

This invention relates to an apparatus for forming metal articles and particularly an article provided with a stem or shank and a head of relatively large cross-sectional size with respect to the shank or with respect to at least a part of the shank. It will be understood, however, that the features of the invention claimed herein are not limited to use with a device of this particular type.

As illustrated the mechanism comprises a die block in which a pair of dies are provided and a gate is slidably mounted on the frame which carries the die block, which gate carries tools to cooperate with the dies.

In addition to the working dies the die block is provided with a cut-off die through which a length of stock is fed for a blank to be cut therefrom, and means are provided to cut off a workpiece from the stock and to transfer it to the first processing die on the die bed which, as shown, is an extruding die in which a portion of the workpiece is extruded so as to reduce its cross-sectional size. The workpiece is then ejected from the extruding die and transferred, by means shown only diagrammatically, to the heading die in which the unextruded larger end portion of the blank is formed into a head. As illustrated, the machine is provided with a single heading die and a single heading punch so that the heading process is performed in a single operation.

One of the features of the present invention is the mechanism for cutting a workpiece from the length of rod or wire stock and transferring it to the extruding die. A compound movement is provided for this mechanism in that the latter is first moved in one direction, vertical as shown herein, to sever the workpiece from the stock and is then moved in a transverse or generally horizontal direction to transfer the workpiece to the extruding die.

Also means are provided to eject the blanks from the extruding and heading dies, which means are actuated by a pitman connected to a crank shaft which is driven from the main crank shaft of the machine. Thus both of the ejecting mechanisms are actuated by the same means and may, therefore, be readily timed to act in unison.

In addition a receding work stop is provided so that the wire or rod stock may be fed against this stop in order to determine the length of the workpiece to be cut. When, however, the cut-off mechanism has gripped the stock, the stop member is allowed to recede so that the work will not bind between the stop and the cut-off mechanism and a cleaner cut will result.

One object of the invention is to provide new and improved means to sever a workpiece from a length of stock and transfer it to a processing station in a heading or like machine.

Still another object of the invention is to provide a mechanism for severing a workpiece from a length of stock, the severing mechanism consisting of two opposing severing members which move together to embrace the stock and thereafter move in the same direction to sever the workpiece.

Still another object of the invention is to provide a cut-off or severing mechanism of the type described wherein one of the severing members, after being moved in one direction to sever the stock, is moved in another direction to transfer the severed workpiece to one of the processing stations of the machine.

A further object of the invention is to provide new and improved means for ejecting the workpiece from one or more of the processing or die stations of a header or like machine.

Still another object of the invention is to provide a new and improved work stop against which the stock is fed for operation thereon by the severing mechanism, the work stop being so controlled that it is permitted to recede from engagement with the end of the wire or rod stock in timed relation with respect to the severing mechanism.

To these and other ends the invention consists in the novel features and combinations of parts to be hereinafter described and claimed.

Figure 2:
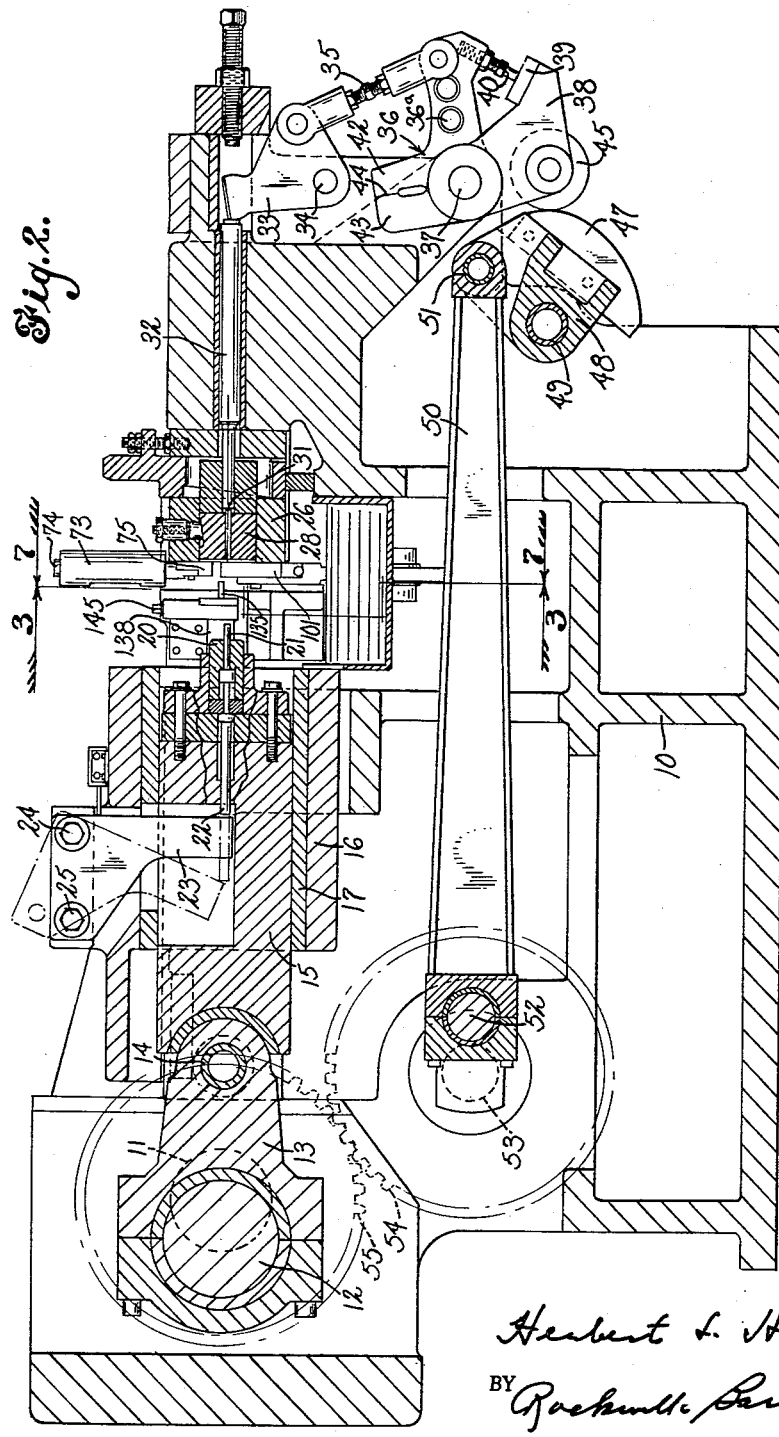
Figure 3:
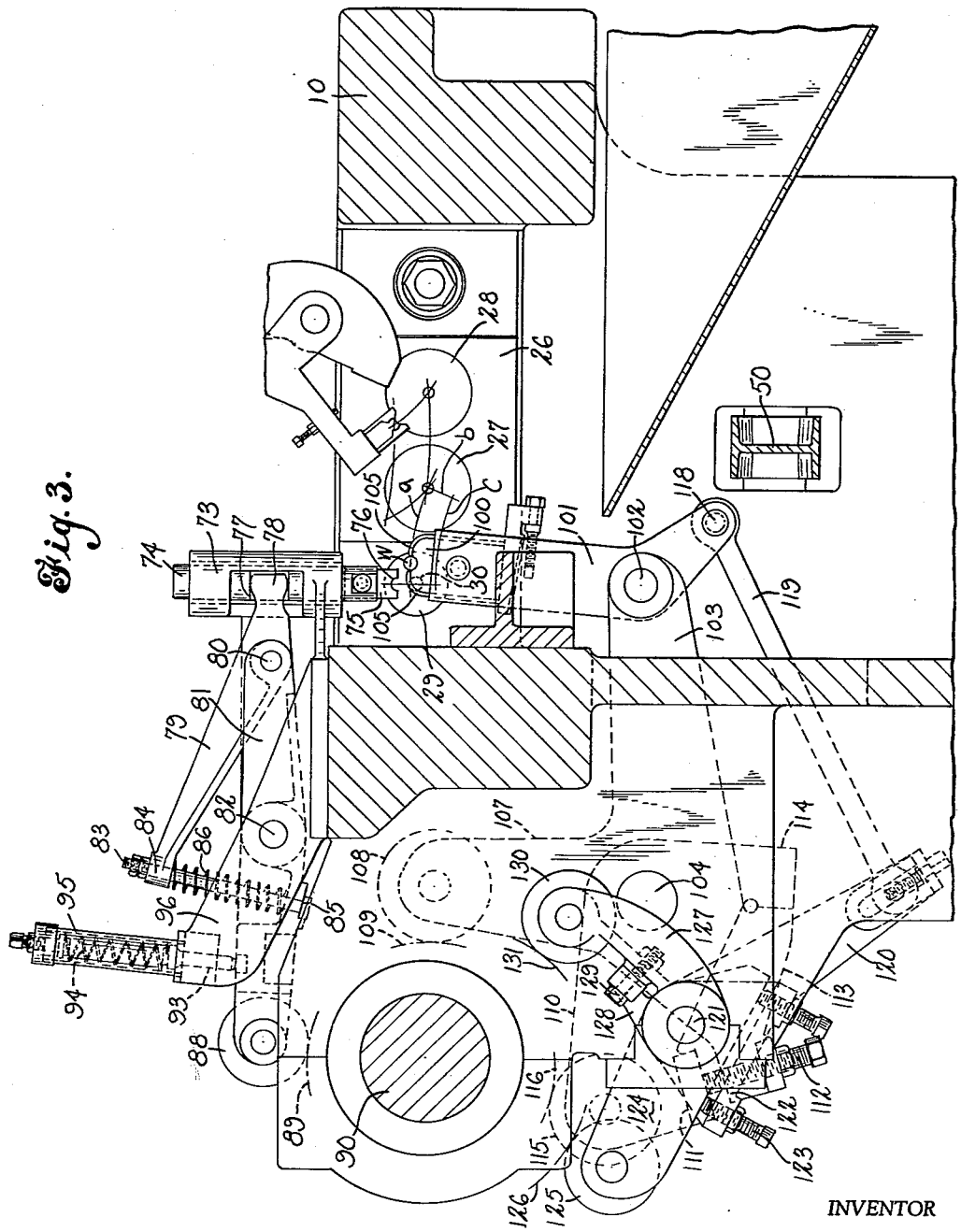

In the accompanying drawings:
FIG. 1 is a top plan view of a header or like mechanism embodying my invention;
FIG. 2 is a longitudinal sectional view on line 2—2 of FIG. 1;
FIG. 3 is a transverse sectional view on line 3—3 of FIG. 2;
FIG. 4 is a partial longitudinal section on line 4—4 of FIG. 1;
FIG. 5 is a detail view of a portion of the mechanism for actuating one of the severing members;
FIG. 6 is a detail view of another portion of the mechanism for operating one of the severing members;
FIG. 7 is a transverse sectional view on line 7—7 of FIG. 2 looking in a direction opposite that of FIG. 3 and illustrating the work stop mechanism;
FIG. 8 is an enlarged sectional view on line 8—8 of FIG. 7;
FIG. 9 is a sectional view on line 9—9 of FIG. 8; and
FIG. 10 is a sectional view on line 10—10 of FIG. 8.

To illustrate a preferred embodiment of the invention there is shown in the drawings an apparatus comprising a supporting frame 10 in which is mounted a main crank shaft 11 having a crank portion 12 thereon. This shaft may be driven from any suitable driving means (not shown). Upon the crank portion 12 is a pitman 13 (FIG. 2) connected by a crank pin 14 to a ram or gate 15 of cylindrical form. This ram is slidably mounted within a housing 16 mounted upon the frame and is embraced by the bearing sleeve 17 mounted within the housing.

At the forward face of the gate or ram are secured an extruding punch 19 and a heading punch 20, the latter being shown in section in FIG. 2. It is provided with an ejecting or blank-stripping pin 21 engaged at its rear end by a knockout rod 22. The rear end of this rod is adapted to engage an abutment 23 secured to the housing 16 so that when the ram is withdrawn rearwardly or toward the left in FIG. 2, the rod 22 will strike the abutment 23 and the ejecting pin 21 would be advanced to strip the work from the punch if it clings thereto. The abutment 23 is secured to the housing by bolts 24 and 25, and the latter may be made of frangible material so as to be fractured if excessive pressure is applied thereto.

A die block 26 is mounted on the frame and is provided with dies 27 and 28 to cooperate with the extruding and heading punches respectively. Also a cut-off die 29 is mounted in the portion of the die block 26 and provided with an opening 30 through which the length of stock is fed for the workpieces or blanks to be cut therefrom.

As shown in FIG. 2, an ejecting pin 31 is mounted in the opening of the die 28, this pin being driven forwardly by the knock-out rod 32. This knock-out rod is advanced by a lever 33 pivoted at 34 to the frame and adjustably connected by an adjustable link 35 to a lever 36 pivoted to the frame at 37.

A second lever 38 is also pivoted to the frame at 37, and this lever carries a frangible plate 39 against which bears a pin 40 adjustably threaded into the lever 36. The levers 36 and 38 are provided with extended ends 42 and 43 respectively which abut at 44 so that upon adjustment of the pin 40 these levers are rigidly connected together. The frangible plate 39 will be fractured if excessive pressure is applied thereto and break the connection between the levers in the direction of movement to advance the pin 32 if the latter meets with excessive resistance.

The lever 38 carries a cam roller 45 which bears upon a cam 47 carried by a rocker member 48 pivoted to the frame at 49. A pitman 50 is pivoted to the rocker member at 51, and at its other end is pivoted to the crank portion 52 of a crank shaft 53. A gear 54 is secured to this shaft, the teeth of which mesh with a gear 55 (FIGS. 1 and 2) carried by the shaft 11.

It may here be noted that the arm 36 is provided with a plurality of openings 36ª for the adjustable connection thereto of the link 35 so that the throw of the lever 33 may be adjusted. As shown more especially in FIG. 4, an ejecting pin 56 is slidably mounted in the extruding die 27 and is advanced forwardly in a direction to eject a workpiece from the die by the knock-out rod 57. This knock-out rod is advanced by the lever 58 pivoted to the frame at 59 and adjustably connected by the link 60 to one arm 61 of a lever pivoted on the frame at 62. The end of the link 60 may be adjustably connected to the arm 61 by means of a slot 63 in the latter and an adjusting screw 64 rotatably mounted in the arm 61. In this manner the throw of the lever 58 may be adjusted.

A second lever 65 is also pivotally connected to the frame at the pivot 62, this lever being provided with a breaker plate 67 of frangible material against which bears the head of a screw 68 adjustably threaded into the arm 61. As is the case with the knock-out of the heading die the levers 61 and 65 are provided with abutting end portions 69 and 70 so that these two levers will ordinarily be rigidly connected.

The lever arm 65 carries a cam follower roller 71 adapted to be engaged by a cam 72 also carried by the rocker member 48 pivoted to the frame at 49 as previously described. Thus the knock-out or ejector mechanism for both the extruding die and the heading die are actuated from the rocker member 48 which in turn is actuated by the pitman 52 although, as indicated, separate cams 47 and 72 are provided for these members. They may be actuated from the same cam if desired.

The rod or wire stock from which the workpieces are cut may be advanced by any suitable feeding means through the opening 30 of the cut-off die 29, and means are provided at the face of this die for cutting a workpiece therefrom. Secured to the frame is a sleeve 73 (FIG. 3) in which is reciprocably mounted a rod 74 carrying a cut-off member 75 at its lower end having a recess 76 therein to embrace the stock. This rod is provided with a recess 77 in which is received the nose 78 of a lever 79 pivoted at 80 to a second lever 81, this second lever being in turn pivoted at 82 to the frame.

A headed bolt 83 is passed slidably through the bored end 84 of the lever 79, and this bolt also passes through the lever 81 against the remote side of which the head 85 of the bolt is disposed. A compression spring 86 surrounding the bolt urges the end 84 of the lever 79 in a direction away from the lever 81 and normally holds these two levers in the position shown in FIG. 3.

Upon the remote end of the lever 81 is a cam follower roller 88 adapted to be engaged by a cam 89 secured to a shaft 90 (FIG. 1) which is driven by bevel gears 91 and 92 from the crank shaft 11. The follower is urged into contact with the cam by a spring-pressed pin 93 (FIG. 3) against which bears a compression spring 94 mounted in a housing 95 carried by a bracket 96 secured to the frame of the machine. With this arrangement it will be seen that the movement of the cut-off member 75 is controlled by the configuration of the cam 89. However, the spring 86 permits movement of the lever 81 in one direction independently of the cut-off member 75 so that overthrow of the lever 81 will be permitted when the cut-off member 75 engages the stock.

Cooperating with the cut-off member 75 is a severing member 100 secured to the upper end of a lever 101 (FIG. 3), this lever being pivoted intermediate its ends at 102 to a second lever 103 pivoted on the frame at 104. Adjacent the severing member are spring fingers 105 which will grip the workpiece after it has been severed from the length of stock so that the severing member or knife may be moved to carry the work to the adjacent extruding die 27.

As shown in FIGS. 3 and 5 the lever 103 is positively actuated in both directions. For this purpose the lever is provided with an arm 107 carrying a cam follower roller 108 adapted to be engaged with a cam member 109 on the shaft 90 which tends to move the lever arm 103 in a clockwise direction about its pivot. To move the lever in the other direction a second lever 110 is also pivoted to the frame at 104 and provided with a breaker plate 111 which is engaged by a screw 112 adjustably threaded into an arm 113 of the lever 103. This arm is also engaged by the arm 114 of the lever 110, and the latter is provided with a cam follower roller 115 adapted to be engaged by a cam 116 mounted on the shaft 90.

With the above arrangement it will be seen that the lever 103 is moved in both directions by the cams 109 and 116, thus varying the position of the pivot point 102 of the lever 101 that carries the knife or severing member 100.

This lever 101 has a compound movement and is also controlled by the mechanism shown at FIG. 6. To the lower end of the lever is pivoted at 118 a link 119 adjustably secured to the lower end of a lever 120 pivoted to the frame at 121. This lever is provided with a plate 122 into which are adjustably threaded screws 123 bearing against the lower edge of an arm 124 carrying a cam follower roller 125 adapted to be engaged by the cam member 126 also mounted on the shaft 90. A second arm 127 is secured to the ear 128 of the arm 124 by the bolt 129 so that the arms 124 and 127 are rigidly secured together. The latter carries a cam follower roller 130 adapted to be engaged by the cam member 131 (FIG. 3). With this construction the arms 124 and 127 are rigidly but adjustably (by the screws 123) secured to the lever 120 so that the latter will be positively oscillated in both clockwise and counter-clockwise directions about its pivot 121, thus swinging the lever 101 about its pivot 102 and moving the knife 100 in a generally horizontal direction while movement of the lever 101 by the arm 103 moves it in a generally vertical direction. Thus the movement of the lever 101 and the severing knife 100 carried thereby is a compound movement, part of which is in a vertical and part in a generally horizontal direction as controlled by the levers 103 and 120.

When a length of stock is fed through the opening of the cut-off die 29, both the knife 100 and member 75 are clear of the opening 30, the former being below this opening and the latter above it. At the beginning of a cycle of the machine the lever 79 moves the member 75 downwardly into engagement with the stock, and the lever 103 is actuated to move the severing knife 100 upwardly to engage the lower side of the stock. When the stock has been gripped between these two members both knives 75 and 100 move upwardly a sufficient distance to sever a workpiece from the stock, the member 75 moving upwardly to the position shown in FIG. 3. This movement of the member 75 is effected by the spring 94 which maintains the roller 88 against the cam 89, and it is moved upwardly to a sufficient extent to clear the opening, as shown in FIG. 3. The severed blank or workpiece designated at W (FIG. 3) will then be gripped by the spring fingers 105 and the lever 120 will be actuated by its controlling cams which engage the followers 125 and 130 to swing the lever 101 about its pivot 102 so as to move the blank along the path indicated at a to a position opposite the opening in the extruding die 21 where it may be engaged by the advancing punch 19. The severing member 100 is then moved downwardly over the path b and then laterally over the path c to its initial position where another length of stock may be fed through the opening 30 to be severed. It will be seen, therefore, that both cut-off members 75 and 100 first move toward the protruding length of stock in opposite directions, then both move in the same direction or upwardly, the member 75 moving a greater distance so as to clear the workpiece held in the spring fingers 105, and thereafter the lever 101 carries the workpiece to the die 27 and is then returned to its original position.

In FIGS. 7 to 10 of the drawings is shown a retractable or withdrawing wire stop against which the stock is fed through the cut-off die 29. As shown more especially in FIG. 8 this stop is in the form of a rod 135 of rectangular cross section mounted opposite the die opening 30, this stop having a screw-threaded portion 136 rigidly mounted thereon or formed integrally therewith. The portion 136 is threadedly received in an internally threaded sleeve 137 slidably mounted in a bracket 138 on the frame. The rear wall 139 of this sleeve is engaged by a pin 140 slidable in a part of the gate housing 16.

Nonrotatably mounted upon the rod 135 is a pinion 142, the teeth of which are engaged by a worm 143 (FIG. 10) on a shaft 144 extending upwardly through a part of the frame and provided with a polygonal end portion 145 to receive a wrench by which the shaft may be turned. The sleeve 137 is held against rotation with respect to the bracket 138 by a key 146. It will be apparent, therefore, that when the shaft 144 is rotated by means of the projecting end 145, the rod 135 will also be rotated and by its threaded connection with the sleeve 137 the rod will be adjusted relatively to this sleeve as the latter is held against rotation by the key 146. This adjusts the wire stop with respect to the die 29 and, therefore, determines the length of the workpiece severed from the stock.

Means are provided to withdraw the wire stop from the stock at a predetermined time in the operation of the device so that the workpiece when severed will not bind. To this end the inner end of the pin 140 is adapted to engage a rod 148 rotatably mounted in the housing 16. This rod is provided with a cut-away portion 149 adapted to receive the pin 140 when the cut-away portion stands opposite the end of the pin. When the full rounded portion of the rod 148 stands against the pin it will be held in its outer operative position to contact the stock and correctly determine the length of the workpiece. At the proper time, however, the rod 148 is rotated through a slight angle to permit the pin 140 to withdraw from the end face of the sleeve 137 into the cut-away or recessed portion 149 of the rod 148.

To effect this movement of the rod the latter is provided with a crank portion 150 upon its extended end above the housing (FIG. 8), and to this crank portion is pivoted one end of a link 151, the other end of which is pivoted to one end of a lever 152 (FIG. 7) pivoted on the frame at 153. The other end of this lever carries a cam follower roller 154 adapted to be engaged by a cam 155 secured to the shaft 90.

The cam follower 154 is urged into engagement with the cam by means of a spring 156 secured at one end to the lever 152 and secured at the other end to a part of the housing 16 of the ram or gate, the spring tending to move the lever 152 in a counterclockwise direction.

The cam 155 is so shaped that at the proper time it will move the roller 154 to the left, as shown in FIG. 7, thus causing the rod 144 to be moved to position to present the recess 149 to the pin 140 and relieve pressure on the pin 140 and permit the wire stop to withdraw. Further rotation of the cam permits the cam follower 154 to be moved to the right in FIG. 7 by the spring 156 so as to permit the lever 152 to swing in a counterclockwise direction and rotate the rod 144 to the position shown in FIG. 9 to cam the pin 140 outwardly and hold the wire stop 135 against the end face of the stock.

While I have shown and described one embodiment of my invention, it will be understood that it is not to be limited to all of the details shown, but is capable of modification and variation within the spirit of the invention and within the scope of the claims.

What I claim is:

1. A header or like mechanism comprising a frame, a working die carried by the frame, means on the frame providing an opening through which a length of stock may be fed for the severing of a workpiece therefrom, means for cutting a workpiece from said length of stock comprising a pair of severing members, one on each side of said opening, one of said members being slidably mounted on the frame for movement toward and from said opening, means for effecting reciprocating movements of said member, said other member comprising a pivoted lever having the severing member at one end thereof, a second lever pivoted on the frame to which said first lever is pivoted, means for moving said second lever to effect movement of said severing member toward said opening, and separate means for moving said first lever on its pivot to effect movement of said severing member toward said die.

2. A header or like mechanism comprising a frame, a working die mounted on said frame, a gate reciprocably mounted on said frame for movement toward and away from said working die, said gate carrying a tool for cooperation with said working die, a cut-off die mounted on said frame and having an opening through which a length of stock is fed for the severing of a workpiece therfrom, a stop pin rotatably and slidably mounted in said frame having an end of said stop pin positioned opposite said cut-off die opening to engage the end face of the stock to determine the length of workpiece to be severed, a collar slidably mounted in said frame and threadedly engaging said stop pin, a release pin slidably mounted in said frame coaxial with said stop pin, said release pin having an end engaging said collar, a cylindrical rod rotatably mounted in said frame, the cylindrical surface of said rod being positioned opposite and adapted to be engaged by the other end of said release pin, said rod having a cutout therein to receive the end of said release pin, means cooperating with the movement of said gate to rotate said rod to cause said release pin to be extended by engagement with the surface of said rod and thereby extend said stop pin through said collar when said stock is being fed through said cut-off die and to rotate said rod to release said stop pin by engagement of said release pin with the cutout in said rod when said workpiece is being severed, and means to rotate said stop pin with relation to said collar to adjust the extended length of said stop pin to adjust the length of workpiece to be severed.

3. The structure defined in claim 2 wherein said means to rotate said stop pin comprises a shaft rotatably mounted in said frame, said shaft having a head projecting from said frame, a worm mounted on said shaft, and a pinion mounted on said stop pin, said pinion engaging said worm to rotate said stop pin with relation to said collar when said shaft is manually rotated.

References Cited in the file of this patent

UNITED STATES PATENTS

| | | |
|---|---|---|
| 784,625 | Holland | Mar. 14, 1905 |
| 927,514 | Eden | July 13, 1909 |
| 1,592,060 | Wilcox | July 13, 1926 |
| 1,640,964 | Schlaupitz | Aug. 30, 1927 |
| 1,921,345 | Clouse | Aug. 8, 1933 |
| 2,069,511 | Wilcox | Feb. 2, 1937 |
| 2,302,531 | Devine | Nov. 17, 1942 |
| 2,542,864 | Friedman | Feb. 20, 1951 |
| 2,916,952 | Schurman | Dec. 15, 1959 |